US Patent Office 2,832,748
Patented Apr. 29, 1958

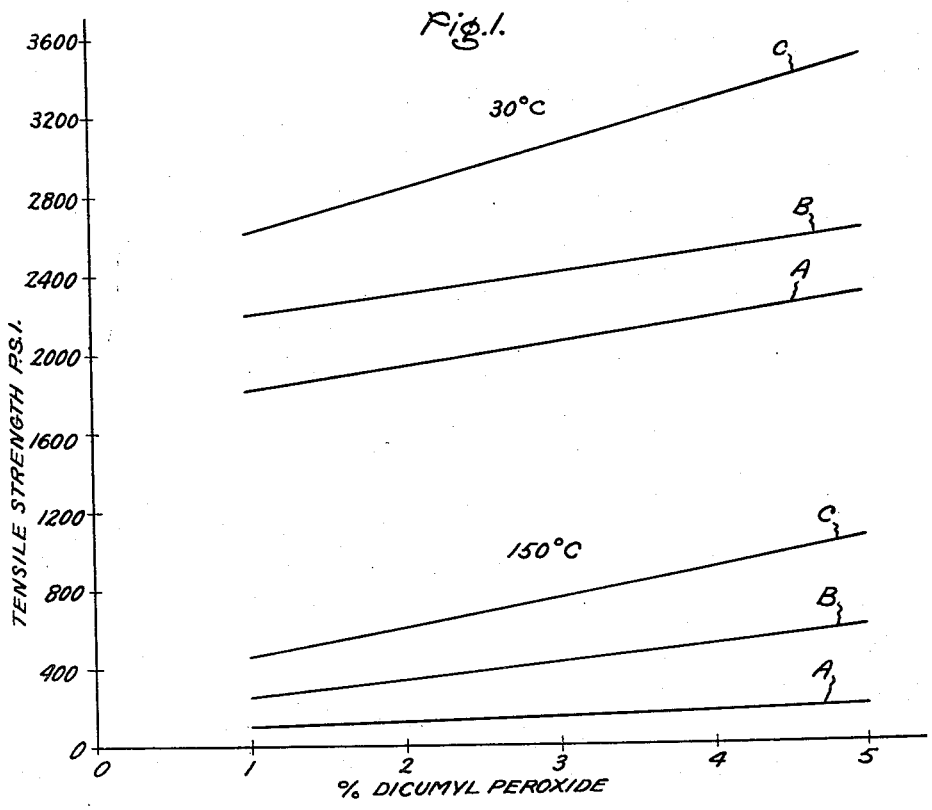
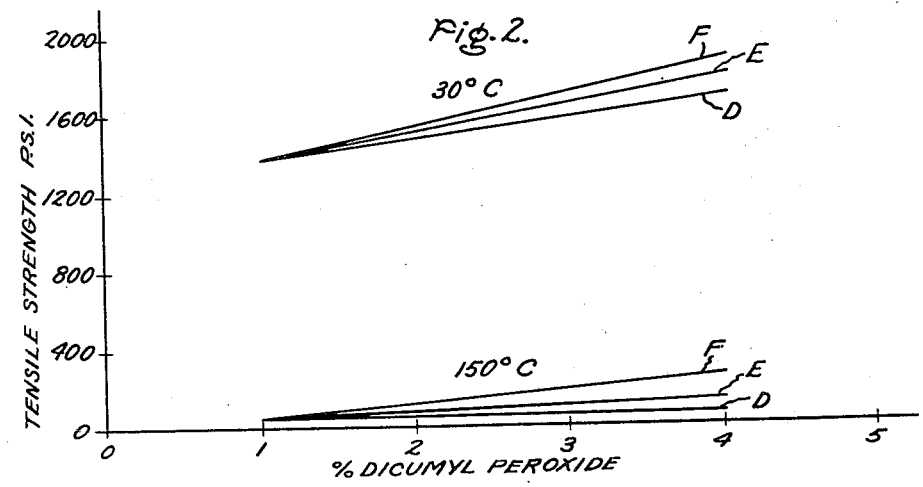

2,832,748

POLYETHYLENE-POLYBUTADIENE BLENDS, PROCESS OF CURING, AND PRODUCTS THEREOF

Moyer M. Safford, Schenectady, and Robert L. Myers, Ballston Lake, N. Y., assignors to General Electric Company, a corporation of New York Application March 27, 1956, Serial No. 574,333

6 Claims. (Cl. 260—45.5)

This invention relates to curable compositions comprising blends of (1) polyethylene, (2) polymerized 1,3-butadiene (hereafter called "polybutadiene"), and (3) di-α-cumyl peroxide, and the cured compositions thereof. More particularly, this invention relates to a method of curing blends of polyethylene and polybutadiene which comprises treating such blends with di-α-cumyl peroxide.

The features of this invention desired to be protected herein are pointed out with particularity in the appended claims. The invention itself may be better understood by reference to the following description taken in conjunction with the accompanying drawing.

In reference to the drawing, Figure 1 shown therein represents the tensile strengths at 30° C. and at 150° C. versus percent of di-α-cumyl peroxide (also called "dicumyl peroxide") of blends or polyethylene and alkali metal polybutadiene (hereafter defined) cured with dicumyl peroxide. Figure 2 represents the corresponding tensile strengths obtained where emulsion polybutadiene (hereafter defined) is substituted for alkali metal polybutadiene in corresponding cured blends.

Among the polymeric materials which have evolved in recent years, polyethylene has proved to be one of the most popular. It has found wide usage as an insulating material, as a container material, as a conduit material, etc. Fabrication, molding, extrusion and calendering of polyethylene are readily accomplished by standard methods, thus facilitating its use for many purposes. Despite all this, however, the applications of polyethylene are greatly limited by its lack of form stability; that is, the ability to retain a particular shape at elevated temperatures, and by its poor high temperature properties, such as poor high temperature tensile strength, tear strength, cut-through strength, etc.

One of the methods employed in improving the physical properties of various polymers is the incorporation of fillers therein. Although marked improvement in high temperature physical properties of polyethylene is noted when certain fillers are incorporated therein, the presence of fillers in polyethylene tends to diminish some of the electrical properties of filled polyethylene as compared to the unfilled polymer.

We have now discovered that when polybutadiene is blended with polyethylene and cured with di-α-cumyl peroxide, a product having high temperature tensile strength and elongation and excellent electrical properties is produced. This blend can be cured with di-α-cumyl peroxide within a short period of time, such as, for example, 15–30 minutes to produce, by a "short cure" method attractive to commercial production, a cured blend having excellent physical and electrical properties. It could not have been predicted that the blend would cure within this short period since as disclosed in the prior art, polybutadiene could be cured by heat and peroxides only over extended periods of time. Furthermore, the uncured peroxide-containing blend can be worked at high temperatures, such as at 130° C., at which temperature other peroxides prematurely decompose. In addition, because of this heat stability, the di-α-cumyl peroxide-containing blends can be shipped in commerce without deleterious effects.

The blend of polyethylene and polybutadiene will hereafter be referred to as "blends" and the di-α-cumyl peroxide-cured blends as "cumyl-cured blends."

In general, the invention can advantageously be carried out by milling polybutadiene and polyethylene on differential rubber rolls (which can advantageously be heated if desired) as di-α-cumyl peroxide is added and intimately incorporated into the blend. Since it is more difficult to obtain a homogeneous blend at lower temperatures, milling is generally carried out at elevated temperatures, such as about 100–135° C.

Thereupon, the blend can be fabricated, molded, extruded or calendered, etc., by suitable methods. The temperature at which the shaping operation is effected can be varied widely depending on whether it is desired that shaping and curing be accomplished in one operation. If desired, the composition can be cured and shaped by a final heat treatment at about 150° C. or higher but below the decomposition temperature of the polymer. Curing of the blend can be effected at ordinary pressures or at super-atmospheric pressure, such as from 10 to 1000 pounds per square inch or more in the mold or press. If the surface cure alone is desired without affecting the interior, blends containing no peroxide may be extruded into a solution containing the peroxide, and thereupon heat-cured to produce a case hardened polymer. Thin films or filaments extruded and heated in this manner will be sufficiently cured throughout.

The polyethylene referred to herein is a solid polymeric material formed by either the high or low pressure polymerization of ethylene. It is described in Patent 2,153,553—Fawcett et al., and in "Modern Plastics Encyclopedia," New York, 1949, pp. 268–271. Specific examples of commercially available solid polyethylene are the polyethylene sold by E. I. du Pont de Nemours & Co., Inc., Wilmington, Delaware, examples of which are "Alathons 1, 3, 10, 12, 14, etc.," those sold by the Bakelite Company, such as "DE-2400, DYNH, etc.," and the low pressure Phillips Petroleum Company polymers, such as "Marlex 20, 50, etc." An excellent discussion of low pressure solid polyethylene within the scope of this invention is found in "Modern Plastics," vol. 33, #1 September 1955) commencing on page 85.

1,3-butadiene can enter into a polymer chain by either a 1,2 or 1,4-mode of addition; the 1,2-mode of addition results in the following "dangling vinyl" structure:

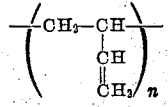

(hereafter called "1,2-polybutadiene"), whereas the 1,4-mode of addition results in the following polymer structure:

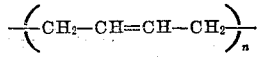

(hereafter called "1,4-polybutadiene"). The types of catalysts are generally used to polymerize 1,3-butadiene, namely the free-radical and the alkali metal type catalyst. When 1,3-butadiene is polymerized by free-radical type catalysts, such as peroxides, persulfates, etc. in an aqueous emulsion system, a higher proportion of 1,4-polybutadiene results as compared to the alkali metal type catalyst wherein a higher proportion of 1,2-polybutadiene is obtained. Using free-radical catalysts, one obtains polybutadiene having less than 25% 1,2-polybutadiene.

Although blends of polyethylene and both alkali metal polymerized butadiene (also called "alkali metal polybutadiene") and free-radical polymerized butadiene (also called "emulsion polybutadiene") can be cured with di-α-cumyl peroxide to products of improved properties, such as tensile strength, etc., blends of polyethylene and alkali metal polybutadiene can be cured with di-α-cumyl peroxide to products of more enhanced properties than the corresponding blends containing emulsion polybutadiene. This appears to be due to the fact that alkali metal polymerized butadiene, which contains larger amounts of "dangling vinyl groups" (1,2-polybutadiene), is more reactive in the presence of di-α-cumyl peroxide than free-radical cured butadiene which has its residual double bonds "buried" in the chain of the 1,4-polybutadiene. Thus, in order to obtain the more enhanced properties, such as high tensile strengths, it is necessary to employ polybutadiene containing high percentages of the 1,2-type, i. e. over 30% and preferably 50–100% 1,2-polybutadiene.

Among the catalysts which have been used are the alkali metals and compounds containing alkali metals. Thus, metals, such as lithium, sodium, potassium, rubidium, cesium, sodium-potassium alloys, and compounds of these metals, such as phenyl isopropyl potassium, triphenyl methyl sodium, lithium butyl, amyl sodium and the like compounds have been used to effect such polymerization.

Whereas free-radical catalysts tend to produce larger amounts of 1,4-polybutadiene, catalysts of the alkali metal type tend to increase the ratio of 1,2-polybutadiene. However, temperature as well as catalysts affect the type of polymer formed; for example, polybutadiene produced by polymerizing 1,3-butadiene with sodium at 110° C. contains about 15% of the 1,2-polybutadiene, whereas 100% of 1,2-type polymer is produced when 1,3-butadiene is polymerized with sodium at −70° C. Although the ratio of the 1,2 to the 1,4-polybutadiene can be determined by ozonization, probably the more accurate method of determining this ratio is by the use of infra-red spectra. Infra-red curves identifying the different types of polymers are found in Dogadkin et al., "Rubber Chemistry and Technology" 24, pp. 591–596 (1951), Hampton, "Anal. Chem." 21, pp. 923–926 (1949), and Meyer, "Ind. Eng. Chem." 41, pp. 1570–1577 (1949). An excellent description of polybutadiene polymers is found in Whitby, "Synthetic Rubber," pp. 734–757, Wiley and Sons, N. Y. (1954), wherein are described methods of preparing polybutadiene falling within the scope of this invention.

Since molecular weight is related to viscosity, viscosity measurements are a convenient method of expressing molecular weight. Although polybutadiene gums of a broad intrinsic viscosity range can be employed, we advantageously have employed polybutadiene having an intrinsic viscosity of 1 to 8 or higher. Optimum properties are obtained using polybutadiene having an intrinsic viscosity of 3.0 to 6.0.

Inherent viscosity is determined by a viscometer, such as an Ostwald viscometer on a 0.25 percent solution of polybutadiene in benzene. This value is calculated as the natural logarithm of the ratio of flow time of the solution to the flow time of the solvent divided by the concentration in grams/100 ml. Intrinsic viscosity $[\eta]$ is obtained by extrapolating the inherent viscosity v. concentration curve to zero concentration.

The above described blends can be cured to products of this invention with di-α-cumyl peroxide,

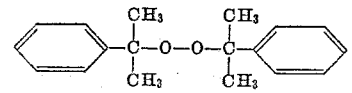

which peroxide can be prepared in the manner described in Karasch et al., "Journal of Organic Chemistry" 15, pp. 753–762 (1950). The proportion of this peroxide to polybutadiene can be varied over wide limits depending on the characteristics desired in the final product. Preferably, we employ the peroxide in amounts ranging from 0.1 to 10 percent or higher based on weight of polymer. Optimum properties and curing time are obtained with about from 1 to 7 percent of peroxide based on weight of polymer.

In order that those skilled in the art may better understand how the present invention may be practiced, the following examples are given by way of illustration and not by way of limitation. All parts are by weight.

EXAMPLE 1

A rubbery polymer was prepared from 1,3-butadiene and finely divided sodium using the technique described in Marvel et al., "J. Polymer Science I," p. 275 (1946). The following procedure was employed: "Into clean dry bottles was placed 0.1 g. of finely divided sodium dispersed in toluene. Thereafter, 25 g. of 1,3-butadiene was charged as a liquid. A small amount of the butadiene was allowed to evaporate to displace any air remaining in the bottle. The bottles were capped, and rotated at 30° C. for a period of 48 hours. The residual catalyst was deactivated by adding 15 ml. of a 10% solution of absolute alcohol in benzene. The rubber was recovered by precipitation from a benzene solution by addition of ethyl alcohol until the polymer no longer precipitated. To this precipitated product was added 0.1% of phenyl-β-naphthylamine as an antioxidant. This unwashed polymer had an intrinsic viscosity of 6.0 when measured in benzene solution. By infra-red analysis, this product contained at least 60% of 1,2-polybutadiene.

EXAMPLE 2

Blends of polyethylene (Alathon 10) and polybutadiene (prepared in the manner of Example 1) were prepared by milling together various ratios of each polymer on differential rubber rolls heated to 130° C. Each polyethylene-polybutadiene blend was cured for 30 minutes at 170° C. with 1–5% di-α-cumyl peroxide based on total weight of both polymers. Tensile strength and percent elongation at both room temperature, 30° C. (Table I) and at 150° C. (Table II) and percent thermoplastic flow at 150° C. (Table III) were measured. Tensile strength in pounds per square inch (p. s. i.) and percent elongation were both measured according to ASTM procedure, D–638–46T. The results of these measurements are found in the following tables.

*Table I*

TENSILE STRENGTH AND PERCENT ELONGATION AT ROOM TEMPERATURE

| Blend | Percent Dicumyl Peroxide | | | | |
| --- | --- | --- | --- | --- | --- |
| | 1 | 2 | 3 | 4 | 5 |
| 95% Polyethylene, 5% Polybutadiene | 1,800 p. s. i. 300% | 1,950 p. s. i. 300% | 2,050 p. s. i. 300% | 2,200 p. s. i. 300% | 2,250 p. s. i. 300%. |
| 80% Polyethylene, 20% Polybutadiene | 2,200 p. s. i. 200% | 2,300 p. s. i. 200% | 2,400 p. s. i. 200% | 2,500 p. s. i. 200% | 2,600 p. s. i. 200%. |
| 60% Polyethylene, 40% Polybutadiene | 2,600 p. s. i. 100% | 2,850 p. s. i. 100% | 3,000 p. s. i. 100% | 3,300 p. s. i. 100% | 3,500 p. s. i. 100%. |

Table II
TENSILE STRENGTH AND PERCENT ELONGATION AT 150° C.

| Blend | Percent Dicumyl Peroxide | | | | |
|---|---|---|---|---|---|
| | 1 | 2 | 3 | 4 | 5 |
| 95% Polyethylene, 5% Polybutadiene | 100 p. s. i. / 300% | 150 p. s. i. / 300% | 175 p. s. i. / 300% | 175 p. s. i. / 150% | 200 p. s. i. / 150%. |
| 80% Polyethylene, 20% Polybutadiene | 250 p. s. i. / 200% | 300 p. s. i. / 200% | 400 p. s. i. / 200% | 500 p. s. i. / 200% | 575 p. s. i. / 200%. |
| 60% Polyethylene, 40% Polybutadiene | 550 p. s. i. / 100% | 600 p. s. i. / 100% | 750 p. s. i. / 100% | 900 p. s. i. / 100% | 1,050 p. s. i. / 100%. |

Table III
THERMOPLASTIC PERCENT FLOW MEASUREMENT AT 150° C.

| Blend | Percent Dicumyl Peroxide | | | | |
|---|---|---|---|---|---|
| | 1 | 2 | 3 | 4 | 5 |
| | Percent | Percent | Percent | Percent | Percent |
| 95% Polyethylene, 5% Polybutadiene | 10 | 6 | 3.25 | 2.0 | 1.5 |
| 80% Polyethylene, 20% Polybutadiene | 6 | 2.75 | 1.5 | 0.8 | 0.75 |
| 60% Polyethylene, 40% Polybutadiene | 2 | 1.25 | 0.8 | 0.75 | 0.5 |

Thermoplastic flow measurements were obtained in the following manner:

(1) A sample disk to be tested (approximately 0.225 inch thick) was accurately measured.

(2) Aluminum foil of .750 inch diameter was placed on each side of the sample disk.

(3) This was placed on a metal disk of the same size and heated in a circulating air oven in which the temperature could be accurately controlled.

(4) The sample was preheated to the desired temperature for 5 minutes.

(5) A load of 15 pounds per square inch was applied to the samples and readings were taken on a micrometric gauge connected to the sample through the oven at 15, 30, 45, 60, 120, 180, 240, 300, and 360 seconds.

(6) The sample was removed after 6 minutes.

(7) The calculations were made as follows:

$$\frac{O.\ R. - T.\ R.}{O.\ T.} \times 100\% = \text{thermoplastic flow}$$

O. T.—original thickness (at room temperature)
O. R.—thickness reading at 0 seconds after pressure applied (at tested temperature)
T. R.—thickness reading after a specified time interval at tested temperature)

From these tables it is noted that the high temperature tensile strength and percent elongation of polyethylene are markedly improved by curing these blends with di-α-cumyl peroxide. In contrast to polyethylene itself which is a liquid at 150° C., we have succeeded in producing polyethylene possessing tensile strengths of over 1000 p. s. i. at a temperature (150° C.) at which polyethylene itself normally has no tensile strength. As demonstrated in Table III, the cured blends of this invention are not appreciably affected by thermoplastic deformation at high temperatures. As desired, the properties of the cured blends can be varied over a wide range by varying the ratio of each polymer and the amount of peroxide employed. Although we prefer to have at least 50% polyethylene, lesser amounts of polyethylene, even as low as 1% of polyethylene, can be used where a more rigid product is desired. Thus, the percent of polyethylene can range from 1–95% based on total weight of polymer.

In order to compare electrical properties of the cured blend with filler containing polyethylene, the following compositions were prepared.

EXAMPLE 3

A composition comprising 87 parts of polyethylene (Alathon 10), 10 parts of polybutadiene (Example 1), and 3 parts of di-α-cumyl peroxide was prepared and cured by the method of Table I. The cured composition had a tensile strength (135° C.) of 163 p. s. i., a percent elongation (135° C.) of 300%, and a percent thermoplastic flow (150° C.) of 1.1%.

EXAMPLE 4

Another blend was prepared by a similar procedure of admixing 77 parts of polyethylene (Alathon 10), 20 parts of polybutadiene (Example 1), and 3 parts of di-α-cumyl peroxide. The cured composition had a tensile strength (135° C.) of 400 p. s. i., a percent elongation (135° C.) of 200%, and a percent thermoplastic flow (150° C.) of 1.1%.

EXAMPLE 5

Polyethylene (Alathon 10, 76 parts), 20 parts of an aerosil (particle size 15–20 mμ), and 4 parts of dicumyl peroxide were blended on a rubber mill and cured in the manner of Examples 3 and 4.

The electrical properties of the compositions of Examples 3 and 4 were compared with the filled polyethylene of Example 5. The results are given in Table IV.

Table IV

| Composition | P. F. | $\epsilon'$ | $\epsilon''$ | $AC_\rho$ | $DC_\rho$ |
|---|---|---|---|---|---|
| Example 3 | .001 | 2.3 | .002 | $1 \times 10^{13}$ | $8 \times 10^{13}$ |
| Example 4 | .002 | 2.3 | .004 | $7 \times 10^{12}$ | $8 \times 10^{13}$ |
| Example 5 | .018 | 2.7 | .047 | $6 \times 10^{11}$ | $8 \times 10^{13}$ |

The tests used in Table IV were carried out according to the following ASTM measurements: power factor (P. F.) D–150–47T, dielectric constant ($\epsilon'$) D–150–47T, loss factor ($\epsilon''$) D–150–47T, alternating current resistivity ($AC_\rho$) D–257–46, and direct current resistivity ($DC_\rho$) D–257–46.

From Table IV it is noted that the electrical properties of the cumyl cured blends are superior to the electrical properties of the filler-containing polyethylene. Although the electrical properties of the cured blends are already superior to cured filled polyethylene, these properties can be further improved by washing polybutadiene prior to use in the blend. Where the sodium-type catalyst is deactivated with water or alcohols and allowed to remain in polybutadiene, the product is called "unwashed." Where the deactivated catalyst is removed by washing with water, the product is called "washed." As shown in application Serial No. 574,332, assigned to the same assignee and filed of even date, the electrical properties of washed polybutadiene are superior to unwashed.

An additional superiority of the cured blends to inorganic filler-containing polyethylene is that the blends are less susceptible to humidity from an electrical viewpoint.

EXAMPLE 6

Emulsion polybutadiene was prepared by adding 25 parts of liquid 1,3-butadiene to a solution of 1.25 parts of soap flakes (Ivory Flakes), 0.3 part of potassium persulfate, and 0.5 part of dodecyl mercaptan in 45 parts of water. The reaction vessel was rotated continuously at 50° C. for 48 hours, then cooled to the temperature of ice-water, and the contents added with stirring to a concentrated aqueous solution (at 0° C.) of sodium chloride. Thereupon 200 cc. of a 2% $H_2SO_4$ solution was added to the slurry. After the product was freed of acid and salts by water washings, water was removed by washing with alcohol and placing the resulting product in a desiccator for 48 hours to remove the residual alcohol. An antioxidant, phenyl-β-napthylamine, 0.1% based on polymer, was then milled into the product.

In addition to the method described in Example 6, emulsion polymerized polybutadiene can be prepared by other methods known to the art as, for example, those methods disclosed in Whitby, "Synthetic Rubber," John Wiley & Sons (1954), pp. 699–701.

EXAMPLE 7

Blends of polyethylene (Alathon 10) and emulsion polybutadiene (prepared in the manner of Example 6) were prepared by milling together various ratios of each polymer on differential rubber rolls heated to 130° C. Each blend was cured for 30 minutes at 170° C. with 1–4 percent di-α-cumyl peroxide based on total weight of both polymers. Tensile strength and percent elongation at both room temperature of 30° C. (Table V) and at 150° C. (Table VI) were measured. Tensile strength in pounds per square inch (p. s. i.) and percent elongation were measured according to ASTM procedure, D–638–46T. These results are found in the following tables (Tables V and VI).

Table V

TENSILE STRENGTH AND PERCENT ELONGATION AT ROOM TEMPERATURE

| Blend | Percent Dicumyl Peroxide | | |
|---|---|---|---|
| | 1 | 2 | 4 |
| 95% Polyethylene, 5% Polybutadiene. | 1,360 p. s. i.<br>150%. | 1,540 p. s. i.<br>200%. | 1,700 p. s. i.<br>200%. |
| 80% Polyethylene, 20% Polybutadiene. | 1,360 p. s. i.<br>200%. | 1,565 p. s. i.<br>200%. | 1,800 p. s. i.<br>200%. |
| 60% Polyethylene, 40% Polybutadiene. | 1,380 p. s. i.<br>350%. | 1,600 p. s. i.<br>200%. | 1,900 p. s. i.<br>200%. |

Table VI

TENSILE STRENGTH AND PERCENT ELONGATION AT 150° C.

| Blend | Percent Dicumyl Peroxide | | |
|---|---|---|---|
| | 1 | 2 | 4 |
| 95% Polyethylene, 5% Polybutadiene. | 20 p. s. i.<br>600%. | 20 p. s. i.<br>300%. | 60 p. s. i.<br>300%. |
| 80% Polyethylene, 20% Polybutadiene. | 20 p. s. i.<br>400%. | 85 p. s. i.<br>200%. | 120 p. s. i.<br>200%. |
| 60% Polyethylene, 40% Polybutadiene. | 40 p. s. i.<br>400%. | 120 p. s. i.<br>200%. | 240 p. s. i.<br>100%. |

By comparing Tables I and II (alkali metal polybutadiene) to Tables V and VI (emulsion polybutadiene), it is evident that blends of the former are cured to products of higher tensile strengths than corresponding blends of the latter.

The tensile strengths (30° C. and 150° C.) obtained by curing blends of polyethylene and alkali metal polybutadiene with dicumyl peroxide were compared with the tensile strengths of the corresponding blends of emulsion polybutadiene. These results are shown in the drawing. Figure 1 represents the tensile strength (at 30° C. and 150° C.) of blends of various proportions of polyethylene (Alathon 10) and alkali metal polybutadiene (Example 1), cured by the method described in Example 2 with the percent of dicumyl peroxide designated on the graph. Curve A represents a blend of 95 parts of polyethylene and 5 parts of polybutadiene; curve B represents 80 parts of polyethylene and 20 parts of polybutadiene; curve C represents 60 parts of polyethylene and 40 parts of polybutadiene.

Figure 2 represents the tensile strength (at 30° C. and 150° C.) of blends of various proportions of polyethylene (Alathon 10) and emulsion polybutadiene (Example 6) cured by the method described in Example 2 with the percent dicumyl peroxide designated on the graph. Curve D represents a blend of 95 parts of polyethylene and 5 parts of butadiene; curve E represents 80 parts of polyethylene and 20 parts of polybutadiene; curve F represents 60 parts of polyethylene and 40 parts of polybutadiene.

On comparing Fig. 1 with Fig. 2, it is evident that products of greater tensile strengths are produced when alkali metal polybutadiene is used in the blend as compared to corresponding compositions containing emulsion polybutadiene.

Since the products of this invention have greater hot strength than polyethylene compositions previously described, they can be used in applications where polyethylene itself has failed due to high temperature form instability. Thus, these products can be used in hot strength films or tapes for electrical insulations, for electrical parts, for example, spark plug caps, for insulating wire, for household utensils which are used at elevated temperatures, for molded industrial parts which are subjected to high temperatures, for example, jet fuel cartridges, and the like, for industrial laminates, for conduits and contains for hot liquids, etc. as well as for other uses which will appear to those skilled in the art.

Although the presence of fillers tends to diminish the electrical properties, their presence is not precluded for certain applications. For example, conducting carbon blacks and metallic particles can be incorporated in these blends for strong but flexible heating pads and tapes. For other applications where electrical properties are of secondary importance, it may be desirable to add other fillers, such as finely divided silica aerogels, xerogels, fumed silicas, such as aerosils, silicas rendered hydrophobic by surface treatment with alcohols in the manner of U. S. Patent 2,657,149—Iler, and trialkylsilanes in the manner of Bueche et al., Serial No. 531,829, filed August 31, 1955, and assigned to the same assignee as the present application. Calcium silicates, aluminas, various kinds of carbon black and other fillers can also be used. In addition, other modifying agents, such as dyes, pigments, stabilizers, plasticizers, antioxidants, etc. can also be added without departing from the scope of the invention.

What we claim as new and desire to secure by Letters Patent of the United States is:

1. A curable composition comprising blends of (1) solid polyethylene, (2) polymerized 1,3 butadiene containing at least 30% 1,2-polybutadiene, and (3) di-α-cumyl peroxide.

2. The cured product of claim 1.

3. The composition of claim 1 in which the polymerized 1,3-butadiene comprises at least 50% 1,2-polybutadiene.

4. The cured product of claim 3.

5. A process of curing blends of solid polyethylene and polybutadiene containing at least 30% 1,2-polybutadiene which comprises heat curing said blends with di-α-cumyl peroxide.

6. The process of claim 5 in which the polybutadiene comprises at least 50% of 1,2-polybutadiene.

(References on following page)

References Cited in the file of this patent

UNITED STATES PATENTS

| | | |
|---|---|---|
| 2,597,741 | Macey | May 20, 1952 |
| 2,612,480 | May | Sept. 30, 1952 |
| 2,628,214 | Pinkney et al. | Feb. 10, 1953 |
| 2,631,954 | Bright | Mar. 17, 1953 |

FOREIGN PATENTS

| | | |
|---|---|---|
| 514,687 | Great Britain | May 3, 1939 |

OTHER REFERENCES

Karasch: Journal of Org. Chem. 15, pages 753–762, 1950.

Whitby: "Synthetic Rubber," pages 734–757, copyright 1954 by John Wiley and Sons, New York, New York.

Braden et al.: "Trans. of the Instit. of the Rubber Ind.," 31 (No. 6), pages 155–165, December 1955.